(12) United States Patent
Ignatyev et al.

(10) Patent No.: US 12,547,628 B2
(45) Date of Patent: *Feb. 10, 2026

(54) SYSTEM AND METHOD FOR QUERY RESOURCE CACHING

(71) Applicant: Oracle International Corporation, Redwood Shores, CA (US)

(72) Inventors: Oleksiy Ignatyev, Belmont, CA (US); Mihail Mihaylov, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/948,754

(22) Filed: Nov. 15, 2024

(65) Prior Publication Data
US 2025/0068631 A1 Feb. 27, 2025

Related U.S. Application Data

(63) Continuation of application No. 18/470,034, filed on Sep. 19, 2023, now Pat. No. 12,197,444, which is a continuation of application No. 15/600,518, filed on May 19, 2017, now Pat. No. 11,803,547.

(51) Int. Cl.
| | | |
|---|---|---|
| G06F 16/20 | (2019.01) | |
| G06F 9/448 | (2018.01) | |
| G06F 16/22 | (2019.01) | |
| G06F 16/2453 | (2019.01) | |
| G06F 16/2455 | (2019.01) | |
| G06F 16/2458 | (2019.01) | |
| G06F 16/901 | (2019.01) | |

(52) U.S. Cl.
CPC ...... *G06F 16/24552* (2019.01); *G06F 9/4494* (2018.02); *G06F 16/2282* (2019.01); *G06F 16/24539* (2019.01); *G06F 16/2456* (2019.01); *G06F 16/2471* (2019.01); *G06F 16/9017* (2019.01)

(58) Field of Classification Search
None
See application file for complete search history.

(56) References Cited

U.S. PATENT DOCUMENTS

| | | | |
|---|---|---|---|
| 7,127,456 B1 * | 10/2006 | Brown | G06F 16/217 707/999.005 |
| 9,652,515 B1 | 5/2017 | Ben-Tzur | |
| 2007/0016558 A1 * | 1/2007 | Bestgen | G06F 16/2471 |
| 2012/0136850 A1 | 5/2012 | Barsness et al. | |
| 2013/0080462 A1 * | 3/2013 | Behne | G06F 16/24542 707/769 |

FOREIGN PATENT DOCUMENTS

| | | |
|---|---|---|
| CN | 102479254 A | 5/2012 |
| CN | 105354193 A | 2/2016 |

* cited by examiner

*Primary Examiner* — Jau Shya Meng
(74) *Attorney, Agent, or Firm* — Invoke

(57) ABSTRACT

Operations include determining whether to cache resources accessed by a query based on the execution time of the query. The system identifies a set of executions of a same query. The system determines a cumulative execution time for the set of executions of the same query. If the cumulative execution time exceeds a threshold value, then the system caches a resource used for execution of the query.

20 Claims, 5 Drawing Sheets

SYSTEM AND METHOD FOR QUERY RESOURCE CACHING

INCORPORATION BY REFERENCE; DISCLAIMER

Each of the following applications are hereby incorporated by reference: application Ser. No. 18/470,034 filed on Sep. 19, 2023; application Ser. No. 15/600,518 filed on May 19, 2017. The applicant hereby rescinds any disclaimer of claims scope in the parent application(s) or the prosecution history thereof and advises the USPTO that the claims in the application may be broader than any claim in the parent application(s).

TECHNICAL FIELD

The present disclosure relates to resource caching. In particular, the present disclosure relates to selectively caching resources accessed by queries.

BACKGROUND

A cache may refer to hardware and/or software for storing data. Retrieving data from cache is typically faster than retrieving data from a hard disk, or any storage system that is remote to an execution environment. Most commonly, a cache stores recently used data. A cache may store a copy of data that is stored at another location, and/or store the result of a computation. Web-based caching is also common, wherein a web cache between a server and a client stores data. The client may access data from the web cache faster than data in the server.

A query fetches specified data from a database. Commonly, data is stored in a relational database. A relational database stores data in one or more tables. The tables are comprised of rows of data, organized into fields or columns. For example, "FirstName" and "LastName" are fields of a data table, and the number of rows therein is the number of names stored to the table.

Structured Query Language (SQL) is a language for managing data in relational databases. An SQL query retrieves data based on specified criteria. Most SQL queries use the statement SELECT, which retrieves data. The SQL query may then specify criteria such as FROM—which tables contain the data; JOIN—to specify the rules for joining tables; WHERE—to restrict the rows returned by the query; GROUP BY—to aggregate duplicative rows; and ORDER BY—to specify the order in which to sort the data. For example, the SQL query "SELECT breed, age, name FROM Dogs WHERE age <3 ORDER BY breed" will return a list of dogs under 3 years old from the table "Dogs," in alphabetical order by breed, retrieving the breed, age, and name of each dog. The output would look like: "Bulldog 1 Max| Cocker Spaniel 2 Joey| Golden Retriever 1.5 Belinda."

Increasingly, databases are stored using a multi-tenant cloud architecture. In a multi-tenant cloud architecture, data from different tenants is stored using shared resources. Shared resources may be some combination of a server, a database, and/or a table, in whole or in part. Multitenancy reduces the amount of resources required to store data, saving costs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
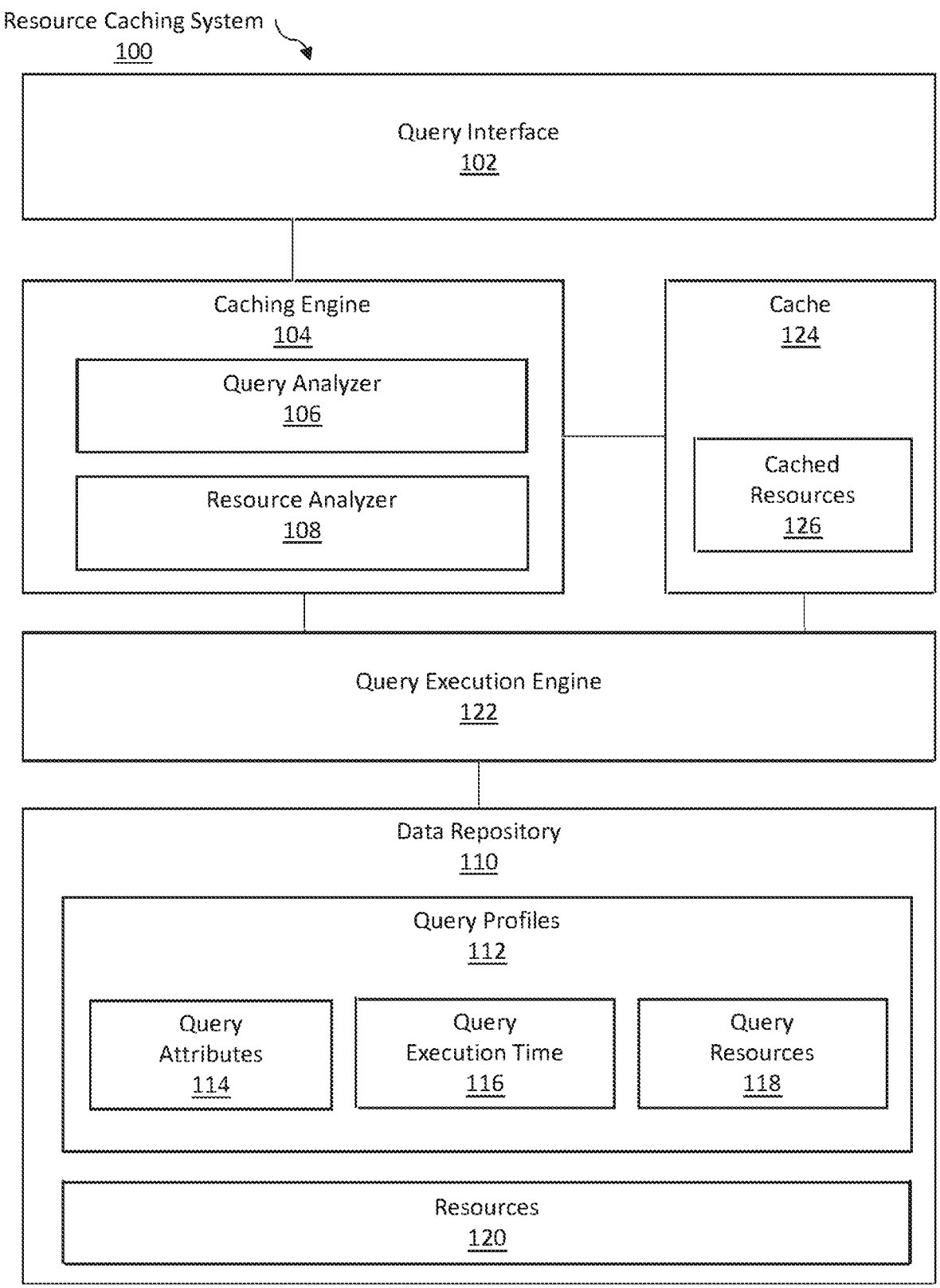
FIG. 1 illustrates an resource caching system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RESOURCE CACHING SYSTEM
3. QUERY-BASED RESOURCE CACHING
4. RESOURCE USAGE-BASED RESOURCE CACHING
5. OPERATION-BASED RESOURCE CACHING
6. EXAMPLE EMBODIMENT-AGGREGATION QUERY
7. MISCELLANEOUS; EXTENSIONS
8. HARDWARE OVERVIEW

1. General Overview

One or more embodiments include selectively caching resources accessed by queries. The cached resources may be continually or periodically updated in response to an original copy of the resource being updated. Maintaining up-to-date resources in a cache allows for execution of queries by accessing resources in the cache, instead of accessing the resources from disk or other primary storage. The resources may be selected for caching based at least on the execution time of the corresponding queries. In an example, if the execution time of an execution of a query exceeds a threshold value, the resources accessed by the query are cached for future executions of the same query.

One or more embodiments include caching resources accessed by a query based on a cumulative execution time of executions of the query. A caching engine may determine a cumulative execution time for executions of a query during an initial period of time. The caching engine may further determine whether a resource, to be accessed during execution of the query, is to be cached based on the cumulative execution time for the executions of the query. The resources may be cached for another period of time subsequent to the initial period of time.

The caching engine may use any methodology for determining which resources to cache based on the cumulative execution time of the corresponding queries. In an example, if the cumulative execution time for a query during an initial period of time exceeds a threshold value, then the resources accessed by the query are cached for a subsequent period of time. In another example, queries are ranked based on cumulative execution time. The resources, for the n queries with the longest cumulative execution time, are cached.

One or more embodiments include caching resources accessed by a query based at least on the execution time of a subset of executions of the query. The execution time for each execution of the query during an initial period of time is compared to a threshold value. If the execution time for any particular execution exceeds the threshold value, then the particular execution is determined to be a computationally expensive execution. If the number of computationally expensive executions of a query exceeds a threshold value, then the resources for the query are cached for a subsequent period of time.

One or more embodiments described in this Specification and/or recited in the claims may not be included in this General Overview section.

2. Resource Caching System

FIG. 1 illustrates a resource caching system 100 in accordance with one or more embodiments. The resource caching system 100 is a system for selecting and caching resources that are accessed for the execution of queries (may be referred to herein as resources accessed by the queries). The resource caching system 100 includes a query interface 102, a caching engine 104, a cache 124, a query execution engine 122, and a data repository 110. In one or more embodiments, the resource caching system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the query interface 102 is an interface which includes functionality to accept input defining a query. The query interface 102 may be a user interface (UI), such as a graphical user interface (GUI). The query interface may present user-modifiable fields that accept query profiles describing a query. The query interface 102 may include functionality to accept and parse a file which defines one or more queries. The query interface may display query output data subsequent to the execution of a query.

In an embodiment, the query execution engine 122 includes hardware and/or software components for executing a query. The query execution engine 122 may parse query profiles received from the query interface. The query execution engine 122 may map the parsed query profiles to an SQL query. The query execution engine 122 may transmit an SQL query to appropriate database(s) for retrieving query results. The query execution engine 122 may sum data, average data, and combine tables in whole or in part.

In an embodiment, the cache 124 corresponds to hardware and/or software components that store data. Data stored in the cache 124 may typically be accessed faster than data stored on a disk, on main memory, or remotely from an execution environment. In an example, the cache 124 stores resources (referred to herein as "cached resources 126") that may have been previously retrieved from disk and/or main memory, for execution of a query. Storing resources in the cache allows for additional executions of the same query without accessing the resources from the disk. Specifically, the resources required by the query are accessed from the cache, instead of from the disk. The cache may be continually or periodically updated in response to the original copy of the data, stored in the disk, being updated. Each data set or resource in the cache 124 may be maintained with a flag indicating whether the data is current or outdated. A cached resource may be, for example, a data table, a data field, and/or the result of a computation. As an example, a cached resource 126 may be a new table created via a JOIN operation on two existing tables.

In an embodiment, the data repository 110 is any type of storage unit and/or device (e.g., a file system, database, collection of tables, or any other storage mechanism) for storing data. Further, the data repository 110 may include multiple different storage units and/or devices. The multiple different storage units and/or devices may or may not be of the same type or located at the same physical site. Furthermore, the data repository 110 may be implemented or may execute on the same computing system as the caching engine 104, the cache 124, the query interface 102, and the query execution engine 122. Alternatively or additionally, the data repository 110 may be implemented or executed on a computing system separate from the caching engine 104, the cache 124, the query interface 102, and the query execution engine 122. The data repository 110 may be communicatively coupled to the caching engine 104, the cache 124, the query interface 102, and the query execution engine 122 via a direct connection or via a network.

In an embodiment, the data repository 110 stores query profiles 112. A query profile 112 comprises information about a query. Query profiles include, but are not limited to, query attributes 114, query execution times 116, and query resources 118. The query profiles may be selected based on query performance. Query profiles 112 may be stored for selected queries with individual execution times above a certain individual threshold value.

In an embodiment, query attributes 114 may include one or more operations executed or to be executed in a query. For example, in the query "SELECT Customers. CustomerName, Customers.CustomerID FROM Customers," the operation SELECT is a query attribute 114. Other examples of query attributes 114 include the order in which a series of operations is executed and the time of day a query is executed.

In an embodiment, query resources 118, within a query profile for query, identify one or more of the resources 120 which are used for execution of the corresponding query. A query resource 118 may include any data set specified in a query. A query resource may correspond to a field. For example, in the query "SELECT Customers. CustomerName, Customers.CustomerID FROM Customers," the query resources 114 include the fields CustomerName and CustomerID. The fields CustomerName and CustomerID are examples of query resources 118. Query resources 118 may include tables in databases used to retrieve data requested in a query. For example, in the above query, the table Customers is a query resource 118. A query resource 118 may be cached in the cache 124, described above, and referred to as a cached resource 126.

In an embodiment, a query execution time 116 is the time corresponding to a particular execution of a query. The query execution time 116 may be a time period between transmitting a request to execute a particular query and receiving results from execution of the particular query. Examples of query execution times include 1 ms, 10 s, 16 minutes, and 6 hours. The execution times of a same query may differ for different executions executed at different times. For example, input/output time delays due to other concurrent access operations may cause execution time of one execution of a query to greatly exceed an execution time of a previous execution of the same query during which there were no other concurrent access operations. A query may be executed on a multitenant cloud architecture supporting multiple users. The system may be overloaded during peak hours when system resources receive requests from multiple users. A query may take longer to execute during peak hours than off-peak hours which the system is not overloaded. Query execution time may also depend upon factors such as the operations in a query and the number of data tables used to retrieve data for a query.

In one or more embodiments, the caching engine 104 includes hardware and/or software components for caching a resource. The caching engine includes functionality to store a copy of data and/or the results of a computation to the cache 124. The caching engine 104 may cache resources selectively, based on execution time of a corresponding query. The caching engine 104 may cache resources according to standard caching techniques, such as by caching recently-used data.

In an embodiment, the query analyzer 106 includes hardware and/or software components for analyzing a query. The query analyzer 106 may analyze query execution times, query attributes, and/or query resources to identify information about a particular query.

The query analyzer 106 may include functionality to parse a query and isolate data fields included in the query, SQL operations included in the query, and/or data tables in a storage system that are used in retrieving the requested data. The query analyzer 106 may include functionality to analyze a set of queries to determine whether one or more query executions constitute the same query. For example, at time 1, the system receives, from User 1, query $Q_a=(f_1, f_2, f_3)$, where $f_i$ are data fields to be retrieved in the query. At time 2, the system receives, from User 2, query $Q_b=(f_2, f_1, f_3)$. Although the elements are in a different order at a different time, $Q_a$ and $Q_b$ are identical in terms of the data retrieved. By analyzing query attributes 114 and query resources 118, the resource caching system 100 can identify multiple executions of a same query.

The query analyzer 106 may include functionality to compute the execution time of a query. The query analyzer may compute an execution time for a single execution of a query. The query analyzer may compute a cumulative execution time for multiple executions of a same query during a particular time period. The query analyzer 106 may compute a cumulative execution time for multiple executions of a same query, by aggregating the execution times for each individual execution of the query.

In an embodiment, the resource analyzer 108 includes hardware and/or software components for analyzing a resource. The resource analyzer 108 may analyze query execution times, query attributes, and/or query resources to identify information about a particular resource.

The resource analyzer 108 may include functionality to parse a query and isolate data fields included in the query, SQL operations included in the query, and/or data tables in a storage system that are used in retrieving the requested data. The query analyzer 106 may include functionality to analyze queries to determine whether one or more query executions use a same resource. For example, at time 1, the system receives, from User 1, query $Q_1$, "SELECT Dog.Breed, Dog.Age FROM Dogs." At time 2, the system receives, from User 2, query $Q_2$, "SELECT Dog.Name, Dog.Breed, DogAquisitionDate FROM Dogs." The resource analyzer can determine that $Q_1$ and $Q_2$ both query the table Dogs.

The resource analyzer 108 may include functionality to compute the amount of time that access to a particular resource is needed during a period of time. The resource analyzer 108 may determine the execution time of each of the queries that use a particular resource during a period of time. The resource analyzer 108 may compute a cumulative execution time for multiple queries that use a particular resource by aggregating the execution times for each individual query.

3. Query-Based Resource Caching

Figure 2:
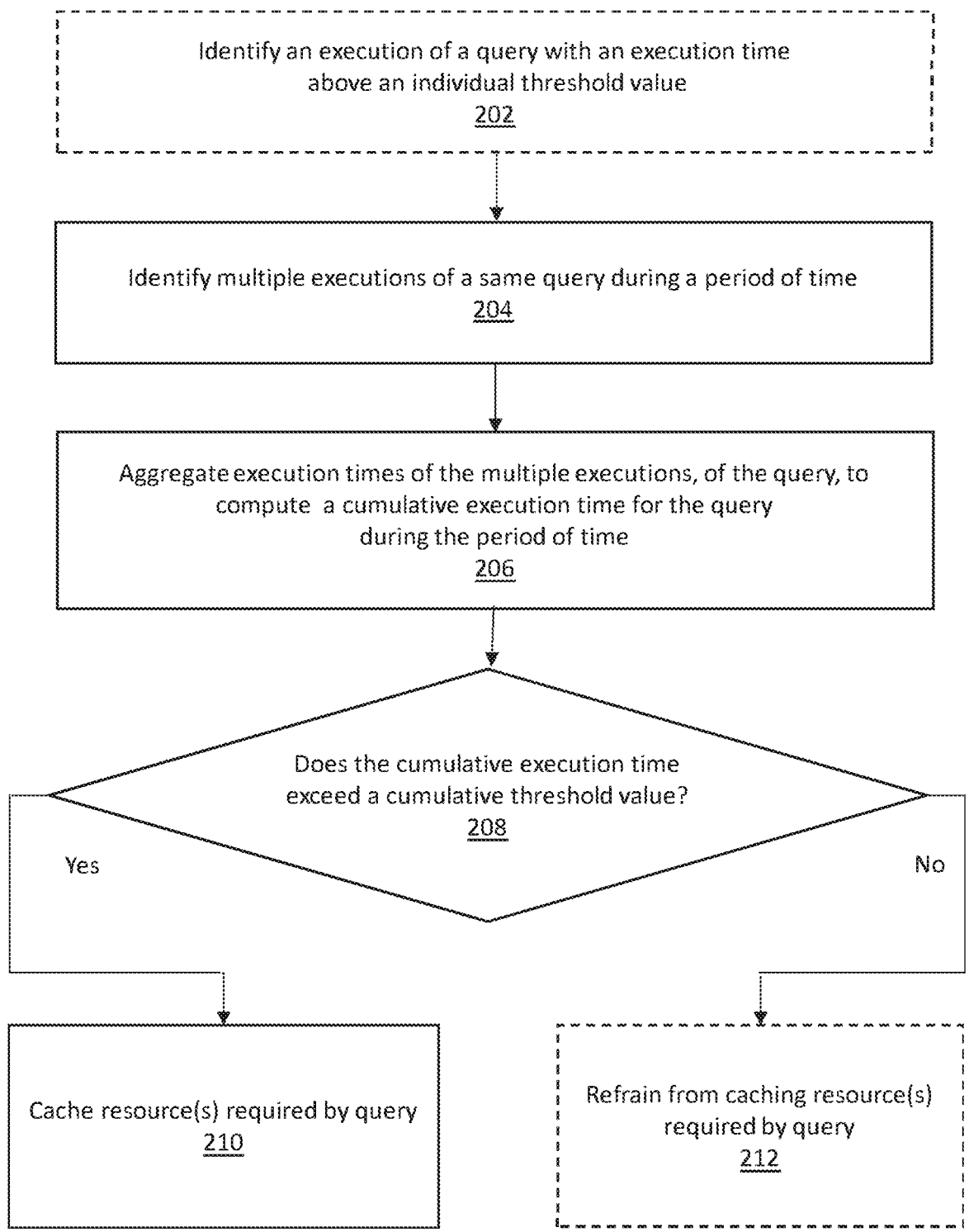
FIG. 2 illustrates an example set of operations for selective caching by query in accordance with one or more embodiments.

FIG. 2 illustrates an example set of operations for selectively caching one or more resources, based on a same query, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the query analyzer identifies a query with an execution time above an individual threshold value (Operation 202). The query analyzer may establish an individual threshold value, $K_1$, for comparison to execution time of individual queries. The value of $K_1$ may be established based on, for example, the complexity of a query, user preference, and system resources available. The query analyzer compares the execution time of a query to $K_1$, to determine if the execution time of the query exceeds $K_1$.

The resource caching system may store query logs for queries with execution times above an individual threshold value. The resource caching system may store query logs for a subset of queries with execution times above an individual threshold value, such as queries including a SELECT query operation.

Operation 202 may be used to identify candidate queries to be analyzed in Operation 204. Alternatively, Operation 202 may be skipped, and all queries may be analyzed in Operation 204.

In an embodiment, the resource caching system identifies one or more executions of a same query during an initial period of time (Operation 204). The query analyzer may compare query attributes of multiple queries, to determine if the queries are the same. For example, the query execution engine executed the following queries $Q_1$-$Q_6$ during a one month period of time, using the SELECT query operation:

$Q_1=(f_1, f_2, f_3, f_4, f_5)$
$Q_2=(f_1, f_2, f_3, f_4, f_5)$
$Q_3=(f_3, f_9, f_2, f_5, f_4)$
$Q_4=(f_1, f_4, f_3, f_5, f_2)$
$Q_5=(f_5, f_6, f_7, f_8, f_9)$
$Q_6=(f_6, f_2, f_3, f_7, f_5)$

The fields, $f_1$-$f_9$, are data fields selected in a query. The query analyzer compares the data field values to identify same queries. Same queries select the same data fields, albeit not necessarily in the same order. The resource caching system identifies that $Q_1=Q_2=Q_4$ are the three executions of a same query that occurred during the month.

In an embodiment, the executions of a particular stored query are determined via a log. Specifically, the caching system maintains a log to track all executions of a stored query. Each query is associated with a profile. The profile includes the characteristics of each execution of the query. The profile may store a runtime for each execution of the query.

In an embodiment, the caching engine aggregates the execution times of the multiple executions of the query, to compute a cumulative execution time for the query during the initial period of time (Operation 206). For example, a query has been executed 6 times in a day. The system has stored 6 corresponding execution times: $T_1=2$ min., $T_2=1$ hr., $T_3=20$ min., $T_4=5$ min., $T_5=1$ hr. 22 min., and $T_6=30$ sec. The system computes the cumulative execution time for the query during the period of time:

$$T_{tot} = T_1 + T_2 + T_3 + T_4 + T_5 + T_6 =$$
$$2 \text{ min.} + 1 \text{ hr.} + 20 \text{ min.} + 5 \text{ min.} + 1 \text{ hr. } 22 \text{ min.} + 30 \text{ sec.} =$$
$$2 \text{ hr. } 49 \text{ min. } 30 \text{ sec.}$$

The cumulative execution time for the query during the one-day period is $T_{tot}=2$ hr. 49 min. 30 sec.

The query analyzer may compute a cumulative execution time using executions of a same query that occurred during a period of time, as shown above. Alternatively, the query analyzer may compute a cumulative execution time using a subset of executions of the same query that occurred during a period of time. For example, the query analyzer filters query executions to include queries with execution times exceeding threshold query execution time $K_1$. With $K_1=15$ minutes, the system would store execution instances with query times over 15 minutes—$T_2$, $T_3$, and $T_5$. The system would then calculate a cumulative query time using the filtered queries:

$$T_{K1} = T_2 + T_3 + T_5$$
$$= 1 \text{ hr.} + 20 \text{ min.} + 1 \text{ hr. } 22 \text{ min.}$$
$$= 2 \text{ hr. } 44 \text{ min.}$$

The cumulative execution time for queries of interest during the one-day period is $T_{K1}=2$ hr. 44 min.

In an embodiment, the caching engine determines whether the cumulative execution time exceeds a cumulative threshold value (Operation 208). For example, the cumulative threshold value is $K_2=2$ hours. For $T_{K1}$ above, the cumulative execution time is 2 hr. 44 min. In this case $T_{K1}>K_2$, and the cumulative execution time exceeds the cumulative threshold value.

If the cumulative execution time exceeds the threshold value, then the caching engine caches resource(s), required by the query, for another period of time subsequent to the initial period of time (Operation 210). For example, the caching engine may cache every table containing fields selected in the query. The caching engine may cache the output of the query. For example, a query selects four fields from a table. The caching engine may cache the data in the four selected fields. The caching engine may retain the resource(s) for a particular amount of time, or overwrite the resource(s) in response to detecting the occurrence of a particular event.

If the cumulative execution time does not exceed a threshold value, then the caching engine may refrain from caching the resource(s) required by the query (Operation 212). By refraining from caching resources required by a fast-running query, the resource caching system conserves memory in the cache and avoids unnecessary operations.

In an embodiment, Operation 212 may be omitted from the sequence of operations. For example, although a particular resource is not selected for caching by the resource caching system described above, the system may nevertheless cache the resource based on another caching methodology. The system may cache the resource immediately subsequent to use per a standard caching technique which includes the caching of resources used in the last 30 seconds.

As an example, the resource caching system identifies queries with a SELECT operation and an execution time above 1 minute, that were executed during a one-year period. Out of 10,000 queries that were executed during the year, 10 included a SELECT operation and took over 1 minute to execute. The query logs for these 10 queries are captured in a table, Table 1.

For each query in Table 1, the resource caching system captures data fields that were selected using the SELECT query operation. These fields are $f_i$, where $i=1, \ldots, n$, and n is the total number of data fields that appeared at least once in the queries from Table 1. Here, Table 1 stores query logs for the following 10 queries:

$Q_1=(f_1, f_2, f_3, f_4, f_5)$
$Q_2=(f_{11}, f_{12}, f_{15})$
$Q_3=(f_3, f_9, f_{12}, f_5, f_{10})$
$Q_4=(f_1, f_4, f_3, f_5, f_2)$
$Q_5=(f_5, f_6, f_7, f_8, f_9)$
$Q_6=(f_{11}, f_{12}, f_{15})$
$Q_7=(f_1, f_2, f_3, f_4, f_5)$
$Q_8=(f_{13}, f_9, f_{20}, f_5, f_4, f_{18}, f_{11}, f_8, f_7)$
$Q_9=(f_1, f_4, f_3, f_5, f_2)$
$Q_{10}=(f_{15}, f_{16}, f_{17}, f_{18}, f_{19}, f_1, f_2, f_3, f_4)$

The resource caching system identifies unique combinations $Q_k=(f_{k1}, \ldots, f_{kl})$ corresponding to at least one query in Table 1. The resource caching system identifies sets of queries $S_k$ containing the same combination of data fields $Q_k=(f_{k1}, \ldots, f_{kl})$. Table 1 contains 6 unique combinations:

$S_1=\{Q_1, Q_4, Q_7, Q_9\}$
$S_2=\{Q_2, Q_6\}$
$S_3=\{Q_3\}$
$S_4=\{Q_5\}$
$S_5=\{Q_8\}$
$S_6=\{Q_{10}\}$

Set 1 includes $Q_1$, $Q_4$, $Q_7$, and $Q_9$ because these queries select the same five data fields, albeit not necessarily in the same order. Set 2 includes queries $Q_2$ and $Q_6$ because these queries select the same three data fields. Sets $S_3$-$S_6$ each contain one unique query—there were no repeats of $Q_3$, $Q_5$, $Q_8$, or $Q_{10}$ during the one-year period of interest.

For each set $S_k$, the resource caching system calculates the cumulative execution time of queries from the set $S_k$. For $S_1$, the execution times are:

$Q_1$: $t_1=2$ minutes
$Q_4$: $t_4=1$ hour
$Q_7$: $t_7=30$ minutes
$Q_9$: $t_9=3$ minutes The resource caching system calculates the cumulative execution time for set $S_1$:

$$T_1 = t_1 + t_4 + t_7 + t_9 = 2 \text{ min.} + 1 \text{ hr.} + 30 \text{ min.} + 3 \text{ min.} = 1 \text{ hr. } 35 \text{ min.}$$

Similarly, the resource caching system calculates the cumulative execution time for sets $S_2$-$S_6$.

Next, the resource caching system determines whether the cumulative execution time for a particular query set exceeds a cumulative threshold value $K_2$=1 hour. For $S_1$, the cumulative execution time is 1 hr. 35 min., which exceeds the cumulative threshold value of 1 hour.

Upon determining that the cumulative execution time exceeds the threshold value for $S_1$, the caching engine caches the resources required by the query. The caching engine creates a cache table $A_1$ in the cache, caching the resources required for execution of the SQL command "SELECT $f_1$, $f_2$, $f_3$, $f_4$, $f_5$. FROM $Z_1$." The resource caching system repeats the process of selectively caching resources, based on the total execution time in a set, for all unique combinations $Q_k$ and their corresponding sets $S_k$.

4. Resource Usage-Based Resource Caching

Figure 3:
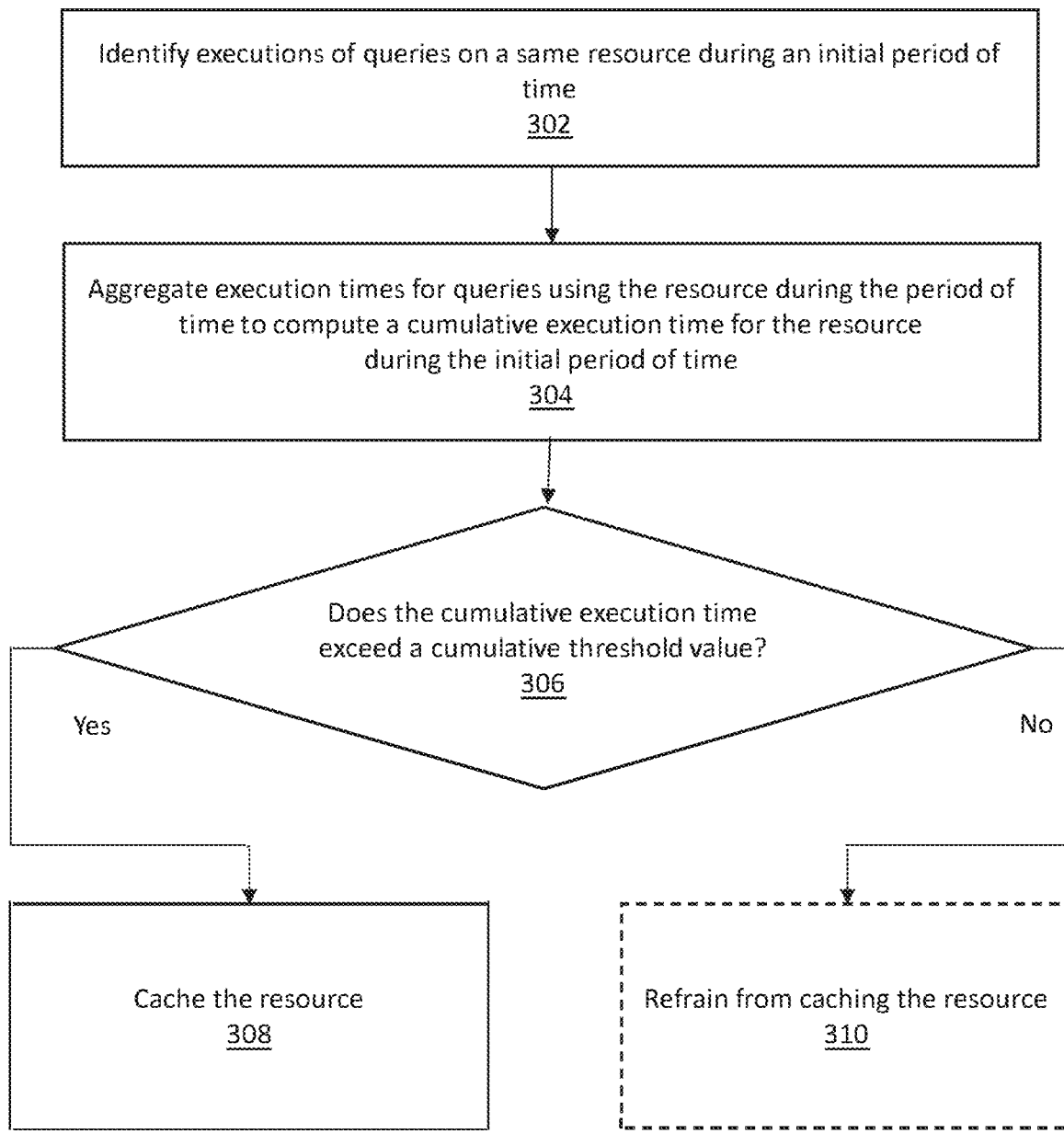
FIG. 3 illustrates an example set of operations for selective caching by resource in accordance with one or more embodiments.

FIG. 3 illustrates an example set of operations for selectively caching resources based on the usage of the resources, in accordance with one or more embodiments. One or more operations illustrated in FIG. 2 may be modified, rearranged, or omitted altogether. Accordingly, the particular sequence of operations illustrated in FIG. 2 should not be construed as limiting the scope of one or more embodiments.

In an embodiment, the resource analyzer identifies executions of queries on a same resource during an initial period of time (Operation 302). The resource analyzer may monitor queries executed by the query execution engine in an initial period of time. The resource analyzer pay use a pull method to pull data, from the query execution engine, identifying the executions of queries. The query execution engine may use a push method to push data, from the query execution engine, to the resource analyzer. The resource analyzer may map each resource, accessed during the initial period of time, to one or more queries that were executed during the initial period of time.

In an embodiment, the resource analyzer aggregates execution times for queries using each particular resource during the period of time to compute a cumulative execution time for each particular resource during the period of time (Operation 304). For example, on a particular day, 100 queries were executed. Five of these queries request information from a particular table. The system has stored five execution times corresponding to the five queries: $t_1$=2 min., $t_2$=1 hr., $t_3$=20 min., $t_4$=5 min., and $t_5$=1 hr. 22 min. The system computes the cumulative execution time for the queries that used the resource during the initial period of time:

$$T_{tot} = t_1 + t_2 + t_3 + t_4 + t_5 =$$
$$2 \text{ min.} + 1 \text{ hr.} + 20 \text{ min.} + 5 \text{ min.} + 1 \text{ hr. } 22 \text{ min.} = 2 \text{ hr. } 49 \text{ min.}$$

The cumulative execution time for the queries that used the resource during the one-day period is $T_{tot}$=2 hr. 49 min.

As described above, the resource analyzer may compute a cumulative execution time of all executions of queries on a same resource during the initial period of time. Alternatively, the resource analyzer may compute a cumulative execution time using a subset of executions of queries on a same resource during a period of time. For example, the resource analyzer filters query executions to include the executions with runtimes exceeding individual threshold value $K_1$.

In an embodiment, the resource analyzer determines whether the cumulative execution time exceeds a cumulative threshold value (Operation 306). If the cumulative execution time exceeds a threshold value, then the caching engine caches the resource (Operation 308). If the cumulative execution time does not exceed the threshold value the caching engine may refrain from caching the resource (Operation 310). Operations 306, 308, and 310 are similar to the above described operations 208, 210, and 212, respectively.

As an example, the resource caching system monitors queries executed by the query execution engine in a twenty-four hour period. The resource caching system creates a table, Table 2, in which it stores a record of queries accessing the table "Ingredients." The resource caching system determines that six queries accessed the table Ingredients in the twenty-four period of interest. The resource caching system stores records of the six queries, along with a respective execution time for each of the six queries, to Table 2: $Q_1$, $t_1$=10 min.; $Q_{12}$, $t_{12}$=1 min., $Q_{30}$, $t_{30}$=4 min.; $Q_{16}$, $t_{16}$=8 min.; $Q_{27}$, $t_{27}$=80 min; $Q_5$, $t_5$=5 min.

Next, the resource caching system aggregates the execution times for the six queries in Table 2 that used the resource, Ingredients, during the twenty-four hour period. By adding the six execution times, the system computes a cumulative execution time for Ingredients during the period of time: $t_1+t_{12}+t_{30}+t_{16}+t_{27}+t_5$=10 min+1 min.+4 min.+8 min.+80 min.+5 min.=108 min.

The resource caching system compares the cumulative execution time to a cumulative threshold value of 60 min. Because the cumulative execution time of 108 minutes exceeds the cumulative threshold value of 60 minutes, the resource caching system caches the resource. The caching engine caches the table Ingredients to the cache.

5. Operation-Based Resource Caching

Figure 4:
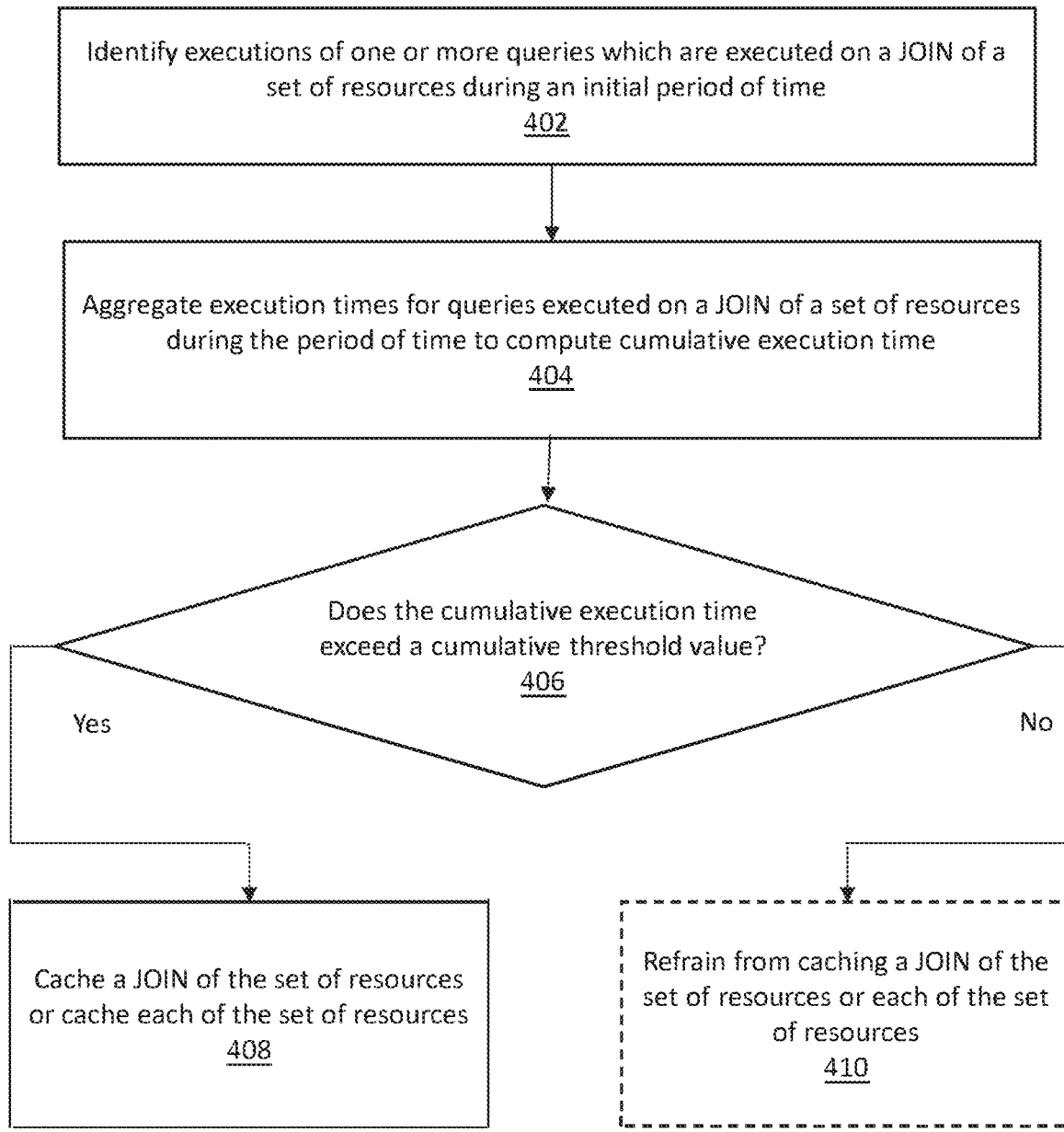
FIG. 4 illustrates an example set of operations for selective caching by JOIN in accordance with one or more embodiments.

FIG. 4 illustrates an example set of operations for selectively caching the results of an operation, in accordance with one or more embodiments. In particular, FIG. 4 illustrates an example in which the results of a JOIN operation are cached. However other embodiments may be equally applicable to caching the results of another operation. One or more operations illustrated in FIG. 4 may be modified, rearranged, or omitted altogether. Accordingly, the particular sequence of operations illustrated in FIG. 4 should not be construed as limiting the scope of one or more embodiments.

In an embodiment, the caching engine identifies executions of queries, which require a JOIN of a particular set of resources, during an initial period of time (Operation 402). The caching engine may compare data fields used in executed JOIN operations to identify all the executions of queries which JOIN the same particular sets of data.

In an embodiment, the resource caching system aggregates the execution times of the executions identified in Operation 402 to compute a cumulative execution time of queries requiring a JOIN of the same particular set of resources (Operation 404). The resource caching system may aggregate the execution times $t_i$ of the queries executed during the initial period of time. Alternatively, the resource caching system may aggregate the execution times $t_i$ of a subset of queries on a JOIN of a set of resources during a period of time. For example, the resource caching system may aggregate the execution times $t_i$ that exceed an individual threshold value $K_1$.

In an embodiment, the caching engine determines whether the cumulative execution time exceeds a cumulative threshold value (Operation 406). The cumulative threshold value may, for example, be $K_2$=30 minutes. The resource caching system compares the computed cumulative execution time to the cumulative threshold value $K_2$.

If the cumulative execution time exceeds a threshold value, then the caching engine caches a JOIN of the set of resources, or caches each of the set of resources (Operation 408). The caching engine may create a cache table, and cache a JOIN of two tables. For example, the resource caching system may create a cache table, and cache the SQL logic "SELECT $f_1$, $f_2$, $f_3$, FROM $Z_1$, INNER JOIN $Z_2$ ON $g_1$=$g_2$," caching the result of the SQL query. Alternatively, the resource caching system may cache resources used in a JOIN operation in the query. For example, the system caches tables $Z_1$ and $Z_2$.

If the cumulative execution time does not exceed a threshold value, then the caching engine may refrain from caching a JOIN of the set of resources and refrain from caching each of the particular set of resources (Operation 410). By refraining from caching resources, the resource caching system conserves memory in the cache and avoids unnecessary operations.

In an embodiment, Operation 410 be omitted from the sequence of operations. For example, although a resource is not selected for caching by the resource caching system, the system may nevertheless cache a resource. The system may cache a resource according to a standard caching mechanism, such as caching resources used in the last 30 seconds.

As an example, the resource caching system identifies executions of queries requiring a SELECT query operation, with execution times above 5 minutes, that were executed during a one-week period. Out of 1,000 queries that were executed during the week, 10 required a SELECT query operation and took over 5 minutes to execute. The query logs for these 10 queries are captured in a table, Table 3.

For each query in Table 3, the resource caching system captures data fields that were selected using the SELECT query operation. These fields are $f_i$, where i=1, ..., n, and n is the total number of data fields that appeared at least once in the queries from Table 3. For each query in Table 3, the resource caching system also captures two data fields that were used in a JOIN operation: $g_{k1}$ and $g_{k2}$. Each query from Table 3 is represented as a record $Q_k$=($f_{k1}$, ..., $f_{k1}$, $g_{k1}$, $g_{k2}$). The resource caching system also stores an execution time $t_k$ for each query.

The query execution engine executes the query "SELECT Customers. CustomerName, Orders. OrderID from Customers INNER JOIN Orders ON Customers.CustomerID=Orders.CustomerID ORDER BY Customers.CustomerName." The resource caching system represents the above query as a combination ($f_{k1}$, $f_{k2}$, $g_{k1}$, $g_{k2}$), where $f_{k1}$=Customers.CustomerName, $f_{k2}$=Orders.OrderID, $g_{k1}$=Customers.CustomerID, and $g_{k2}$=Orders.CustomerID.

The resource caching system identifies that queries $Q_1$, $Q_{10}$, $Q_{17}$, and $Q_{26}$ from Table 3 contain the same unique combination ($f_{k1}$, $f_{k2}$, $g_{k1}$, $g_{k2}$). The resource caching system identifies the set of queries from Table 3 containing the same unique combination: Set $S_1$={$Q_1$, $Q_{10}$, $Q_{17}$, $Q_{26}$}. The resource caching system identifies the corresponding execution times for each query in set $S_1$: $t_1$=10 minutes, $t_{10}$=15 minutes, $t_{17}$=20 minutes, and $t_{26}$=10 minutes.

The resource caching system aggregates the execution times for the queries in set $S_1$ to compute a cumulative execution time: $T_1$=$t_1$+$t_{10}$+$t_{17}$+$t_{26}$=10 min.+15 min.+20 min.+10 min.=55 minutes.

Next, the resource caching system determines whether the calculated cumulative execution time exceeds a cumulative threshold value $K_2$=30 minutes. For $S_1$, the cumulative execution time is 55 minutes, which exceeds the cumulative threshold value $K_2$=30 minutes.

Upon determining that the cumulative execution time exceeds the threshold value for $S_1$, the caching engine caches a join of the set of resources. The caching engine creates a cache table $C_1$ in the cache, caching the SQL logic "SELECT Customers. CustomerName, Orders.OrderID from Customers INNER JOIN Orders ON Customers.CustomerID=Orders.CustomerID ORDER BY Customers.CustomerName." The resource caching system can now use the results from cache table $C_1$ to complete the above SQL logic step for future queries containing this logic.

6. Example Embodiment—Aggregation Query

In an embodiment, the resource caching system stores query logs for queries with query execution times exceeding an individual threshold value $K_1$=1 min. The other criterion for storing a query log is that the query requires an aggregation operation, applied to data received as a result of a GROUP BY operation. Examples of SQL aggregation operations include AVG, MAX, and MIN. The system may store query logs for aggregation operations with execution times exceeding 1 minute to a table, Table 4.

For queries in Table 4, the system captures data fields that were selected using the SELECT query operation ($f_i$), and data fields that were used by a GROUP BY query operation ($g_j$). The indexes are defined as: i=1, ..., n, where n is the total number of data fields that appeared at least once in the queries from Table 4, and j=1, ... m, where m is the total number of data fields that appeared at least once in a GROUP BY operation in the queries from Table 4. For example, Table 4 includes the record $Q_1$=($f_1$, $f_2$, $f_3$, $g_1$, $g_2$), representing Query 1. The record $Q_1$ means that, in Query 1, the SQL logic "SELECT $f_1$, $f_2$, $f_3$ GROUP BY $g_1$, $g_2$" was applied. For each query in Table 4, the system represents a record $Q_k$=($f_{k1}$, ..., $f_{k1}$, $g_{k1}$, ... $g_{km}$), along with $t_k$, the execution time of query $Q_k$. Another threshold, $K_2$ is defined. $K_2$ is a cumulative query threshold of 30 minutes.

The query execution engine executes a query $Q_1$=($f_1$, $f_2$, $f_3$, $g_1$=$f_2$, $g_2$=$f_3$) with the SQL logic "SELECT $f_1$, $f_2$, $f_3$, GROUP BY $f_2$, $f_3$." The resource caching system identifies that queries $Q_1$, $Q_{12}$, Qis and $Q_{23}$ from Table 4 contain the unique combination ($f_1$, $f_2$, $f_3$, $g_1$=$f_2$, $g_2$=$f_3$). The resource caching system identifies a set of queries, $S_1$={$Q_1$, $Q_{12}$, $Q_{15}$, $Q_{23}$}. The execution times for the queries in $S_1$ are: $t_1$=20 minutes, $t_{12}$=10 minutes, $t_{15}$=25 minutes, and $t_{23}$=15 minutes.

The resource caching system calculates the cumulative execution time of the queries in $S_1$: $T_1$=$t_1$+$t_{12}$+$t_{15}$+$t_{23}$=20 min.+10 min.+25 min.+15 min.=70 min. The resource caching system determines that $T_1$>$K_2$, as the cumulative execution time exceeds 30 min. Therefore, the resource caching system creates cache table $D_1$, capturing data following the SQL logic "SELECT $f_1$, $f_2$, $f_3$, GROUP BY $f_2$, $f_3$." The system uses results from cache table $D_1$ to complete the SQL logic step "SELECT $f_1$, $f_2$, $f_3$, GROUP BY $f_2$, $f_3$" in future queries. For example, $f_1$="revenue", $f_2$=$g_1$="region", $f_3$=$g_2$="vertical." The caching engine caches the results of the query "SELECT revenue, region, vertical GROUP BY region vertical." The next time the system executes a query requiring the above SQL logic, the query execution engine will use the results from cached table $D_1$ to execute the required SQL logic and quickly deliver the results.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
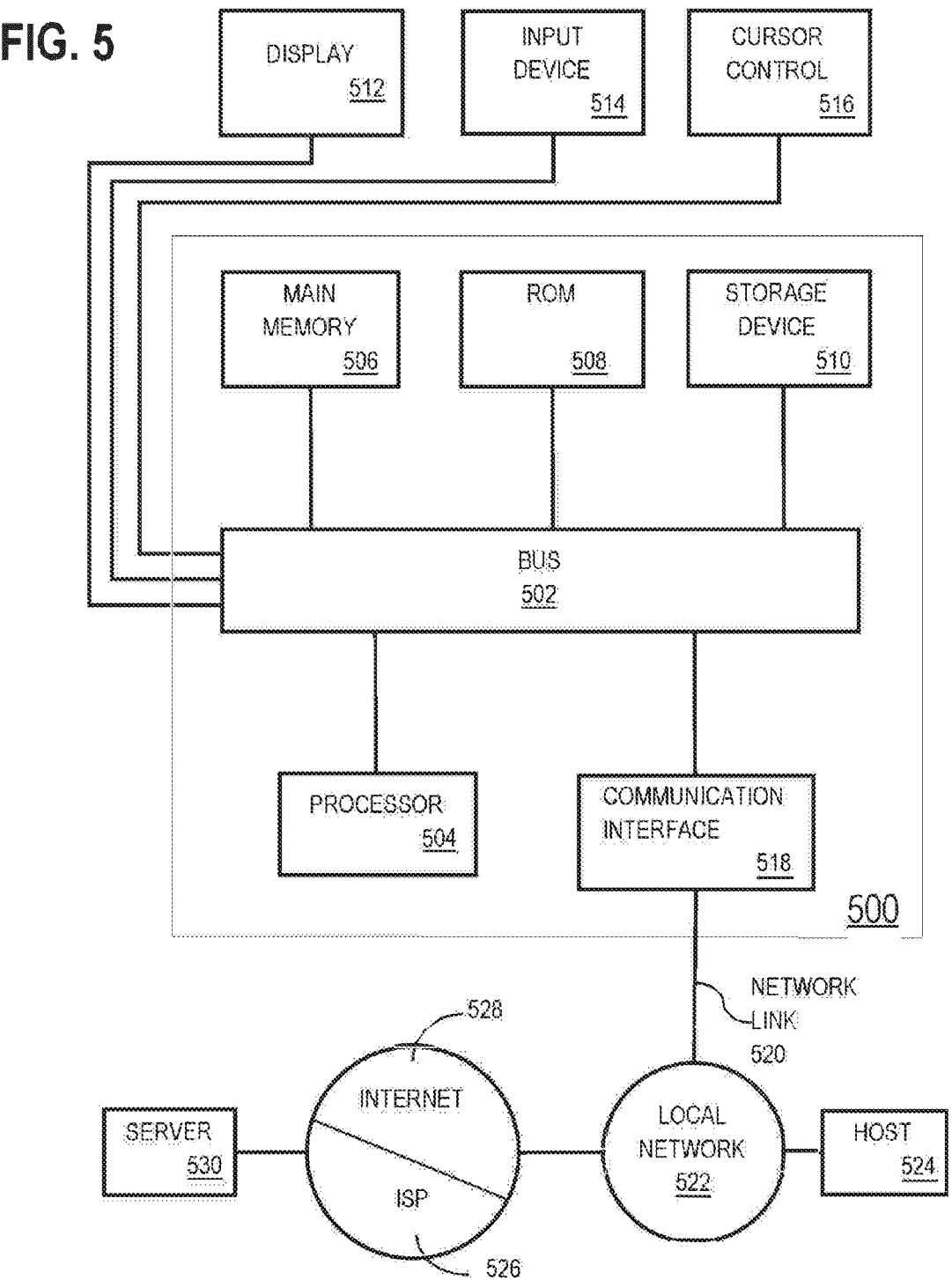
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510. Volatile media include dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a first set of one or more executions, of each of a first set of one or more queries during a first period of time, that use a first resource;
   determining a first cumulative execution time of the first set of one or more executions and associated with the first resource, exceeds a first threshold;
   based on determining the first cumulative execution time exceeds the first threshold: selecting the first resource as a first candidate for caching;
   identifying a second set of one or more executions, of each of a second set of one or more queries during the first period of time, that use a second resource;
   determining a second cumulative execution time of the second set of one or more executions and associated with the second resource, exceeds the first threshold;
   based on determining the second cumulative execution time exceeds the first threshold: selecting the second resource as a second candidate for caching;
   applying a ranking criterion to the first resource and the second resource that have both been selected as candidates for caching based on respectively associated cumulative execution times;
   based on the ranking criterion:
      caching the first resource for a second period of time; and
      refraining from caching the second resource for the second period of time.

2. The non-transitory computer readable medium of claim 1, wherein the ranking criterion for ranking a particular resource, including the first resource and the second resource, comprises at least one of:
   a cumulative execution time of one or more queries using a particular resource;
   a type of resource used by the one or more queries;
   a size of the resource used by the one or more queries; and
   a frequency that the particular resource was used to execute any query during the first period of time.

3. The non-transitory computer readable medium of claim 1, wherein the first resource is a table.

4. The non-transitory computer readable medium of claim 1, wherein identifying the first set of one or more executions of each of the first set of one or more queries during the first period of time comprises identifying a plurality of executions of a first query during the first period of time,
   wherein the operations further comprise:
      determining that an execution time for at least a subset of the plurality of executions of the first query exceeds a second threshold value; and
      determining the first cumulative execution time for the plurality of executions of the first query during the first period of time by aggregating execution times of each execution of the plurality of executions,
   wherein computing the first cumulative execution time is performed in response to determining that the execution time for at least a subset of the plurality of executions of the first query exceeds the second threshold value.

5. The non-transitory computer readable medium of claim 1, wherein identifying the first set of one or more executions of each of the first set of one or more queries during the first period of time comprises identifying a plurality of executions of a first query during the first period of time,
   wherein the operations further comprise:
      determining that an execution time for at least a subset of the plurality of executions of the first query exceeds a second threshold value; and
      determining the first cumulative execution time for the plurality of executions of the first query during the first period of time by aggregating execution times of each execution of the plurality of executions, and wherein computing the first cumulative execution time is performed based on a number of the subset of the plurality of executions of the first query that exceeds the second threshold value.

6. The non-transitory computer readable medium of claim 1, wherein determining an execution time for a first execution of a first query comprises: determining a time period between transmitting a request to execute the first query and receiving results from execution of the first query.

7. The non-transitory computer readable medium of claim 1, wherein identifying the first set of one or more executions of a first query that uses the first resource comprises accessing historical query execution data in a stored table of query data fields.

8. The non-transitory computer readable medium of claim 1, wherein identifying the first set of one or more executions of each of the first set of one or more queries during the first period of time comprises identifying one or more executions of a first plurality of queries using the first resource during the first period of time, and
    wherein the operations further comprise:
        determining that an execution time for at least a subset of the first plurality of queries exceeds a second threshold value; and
        responsive to determining that the execution time for at least the subset of the first plurality of queries exceeds the second threshold value, storing, to a data table, a log for each execution, of the subset of the first plurality of queries exceeding the second threshold value.

9. The non-transitory computer readable medium of claim 1, wherein the operations further comprise:
    identifying a third set of one or more executions, of each of a third set of one or more queries during the first period of time, that use a third resource;
    determining a third cumulative execution time of the third set of one or more executions and associated with the third resource, does not exceed the first threshold;
    based on determining the second cumulative execution time does not exceed the first threshold:
        refraining from selecting the third resource as a third candidate for caching; and
        refraining from applying the ranking criterion to the third resource.

10. A method comprising:
    identifying a first set of one or more executions, of each of a first set of one or more queries during a first period of time, that use a first resource;
    determining a first cumulative execution time of the first set of one or more executions and associated with the first resource, exceeds a first threshold;
    based on determining the first cumulative execution time exceeds the first threshold: selecting the first resource as a first candidate for caching;
    identifying a second set of one or more executions, of each of a second set of one or more queries during the first period of time, that use a second resource;
    determining a second cumulative execution time of the second set of one or more executions and associated with the second resource, exceeds the first threshold;
    based on determining the second cumulative execution time exceeds the first threshold: selecting the second resource as a second candidate for caching;
    applying a ranking criterion to the first resource and the second resource that have both been selected as candidates for caching based on respectively associated cumulative execution times;
    based on the ranking criterion:
        caching the first resource for a second period of time; and
        refraining from caching the second resource for the second period of time,
        wherein the method is executed by at least one device including a hardware processor.

11. The method of claim 10, wherein the ranking criterion for ranking a particular resource, including the first resource and the second resource, comprises at least one of:
    a cumulative execution time of one or more queries using a particular resource;
    a type of resource used by the one or more queries;
    a size of the resource used by the one or more queries; and
    a frequency that the particular resource was used to execute any query during the first period of time.

12. The method of claim 10, wherein the first resource is a table.

13. The method of claim 10, wherein identifying the first set of one or more executions of each of the first set of one or more queries during the first period of time comprises identifying a plurality of executions of a first query during the first period of time,
    wherein the method further comprises:
        determining that an execution time for at least a subset of the plurality of executions of the first query exceeds a second threshold value; and
        determining the first cumulative execution time for the plurality of executions of the first query during the first period of time by aggregating execution times of each execution of the plurality of executions,
        wherein computing the first cumulative execution time is performed in response to determining that the execution time for at least a subset of the plurality of executions of the first query exceeds the second threshold value.

14. The method of claim 10, wherein identifying the first set of one or more executions of each of the first set of one or more queries during the first period of time comprises identifying a plurality of executions of a first query during the first period of time,
    wherein the method further comprises:
        determining that an execution time for at least a subset of the plurality of executions of the first query exceeds a second threshold value; and
        determining the first cumulative execution time for the plurality of executions of the first query during the first period of time by aggregating execution times of each execution of the plurality of executions, and
        wherein computing the first cumulative execution time is performed based on a number of the subset of the plurality of executions of the first query that exceeds the second threshold value.

15. The method of claim 10, wherein determining an execution time for a first execution of a first query comprises: determining a time period between transmitting a request to execute the first query and receiving results from execution of the first query.

16. The method of claim 10, wherein identifying the first set of one or more executions of a first query that uses the first resource comprises accessing historical query execution data in a stored table of query data fields.

17. The method of claim 10, wherein identifying the first set of one or more executions of each of the first set of one or more queries during the first period of time comprises identifying one or more executions of a first plurality of queries using the first resource during the first period of time, and
    wherein the method further comprises:
        determining that an execution time for at least a subset of the first plurality of queries exceeds a second threshold value; and
        responsive to determining that the execution time for at least the subset of the first plurality of queries exceeds the second threshold value, storing, to a data table, a log for each execution, of the subset of the first plurality of queries exceeding the second threshold value.

18. The method of claim 10, wherein the method further comprises:
    identifying a third set of one or more executions, of each of a third set of one or more queries during the first period of time, that use a third resource;
    determining a third cumulative execution time of the third set of one or more executions and associated with the third resource, does not exceed the first threshold;
    based on determining the second cumulative execution time does not exceed the first threshold: refraining from selecting the third resource as a third candidate for caching; and
    refraining from applying the ranking criterion to the third resource.

19. A system comprising:
at least one device including a hardware processor; and
memory storing instructions that, when executed by the hardware processor, cause the system to perform operations comprising:
identifying a first set of one or more executions, of each of a first set of one or more queries during a first period of time, that use a first resource;
determining a first cumulative execution time of the first set of one or more executions and associated with the first resource, exceeds a first threshold;
based on determining the first cumulative execution time exceeds the first threshold: selecting the first resource as a first candidate for caching;
identifying a second set of one or more executions, of each of a second set of one or more queries during the first period of time, that use a second resource;
determining a second cumulative execution time of the second set of one or more executions and associated with the second resource, exceeds the first threshold;
based on determining the second cumulative execution time exceeds the first threshold: selecting the second resource as a second candidate for caching;
applying a ranking criterion to the first resource and the second resource that have both been selected as candidates for caching based on respectively associated cumulative execution times; and
based on the ranking criterion:
    caching the first resource for a second period of time; and
    refraining from caching the second resource for the second period of time.

20. The system of claim 19, wherein the ranking criterion for ranking a particular resource, including the first resource and the second resource, comprises at least one of:
    a cumulative execution time of one or more queries using a particular resource;
    a type of resource used by the one or more queries;
    a size of the resource used by the one or more queries; and
    a frequency that the particular resource was used to execute any query during the first period of time.

\* \* \* \* \*